(12) United States Patent (10) Patent No.: US 12,682,076 B2
Hopfer et al. (45) Date of Patent: Jul. 14, 2026

(54) SYSTEMS, APPARATUS AND METHODS FOR AUTOMATICALLY TESTING SECURITY DEVICES

(71) Applicant: Communications Test Design, Inc., West Chester, PA (US)

(72) Inventors: Timothy Hopfer, Downingtown, PA (US); Nidhin Davis, Glen Mills, PA (US); Patrick Dameron, West Chester, PA (US)

(73) Assignee: Communications Test Design, Inc., West Chester, PA (US)

( * ) Notice: Subject to any disclaimer, the term of this patent is extended or adjusted under 35 U.S.C. 154(b) by 75 days.

(21) Appl. No.: 18/724,115

(22) PCT Filed: Jan. 25, 2023

(86) PCT No.: PCT/US2023/011518
§ 371 (c)(1),
(2) Date: Jun. 25, 2024

(87) PCT Pub. No.: WO2023/146895
PCT Pub. Date: Aug. 3, 2023

(65) Prior Publication Data
US 2025/0077684 A1 Mar. 6, 2025

Related U.S. Application Data

(60) Provisional application No. 63/302,606, filed on Jan. 25, 2022.

(51) Int. Cl.
G06F 21/00 (2013.01)
G06F 21/57 (2013.01)
(52) U.S. Cl.
CPC ...... G06F 21/577 (2013.01); *G06F 2221/034* (2013.01)

(58) Field of Classification Search
CPC .................................................... G06F 21/577
See application file for complete search history.

(56) References Cited

U.S. PATENT DOCUMENTS

2013/0033279 A1 2/2013 Sozanski et al.
2015/0127362 A1 5/2015 DeBusk et al.
(Continued)

OTHER PUBLICATIONS

Office Action issued for Canadian Patent Application No. 3,242,336 dated May 22, 2025, 4 pages.
(Continued)

*Primary Examiner* — Jeffrey C Pwu
*Assistant Examiner* — Thong P Truong
(74) *Attorney, Agent, or Firm* — Duane Morris LLP

(57) ABSTRACT

Systems, apparatus and methods for automatically testing security devices through mobile devices are disclosed according to various embodiments. In one example, a disclosed system comprises: a plurality of test chambers coupled on a frame, wherein each of the test chambers is configured to house: (a) a corresponding one of a plurality of security devices to be tested and (b) a corresponding one of a plurality of mobile devices; and a plurality of test computers coupled to the frame, wherein each of the test computers corresponds to one of the plurality of test chambers, and has a processor and a non-transitory computer readable storage medium for automatically testing a corresponding one of the plurality of security devices using a test software. The corresponding mobile device is connected to the test computer and has a test application installed thereon corresponding to the test software. The test application and the test software cooperate during the testing to control the corresponding mobile device to communicate with the corresponding security device.

9 Claims, 4 Drawing Sheets

(56)     References Cited

U.S. PATENT DOCUMENTS

| | | |
|---|---|---|
| 2015/0244476 A1 | 8/2015 | Partee |
| 2018/0026737 A1 | 1/2018 | Kucheravy |
| 2018/0054265 A1 | 2/2018 | Lee et al. |
| 2019/0260488 A1* | 8/2019 | Emmanuel ............... H04N 7/12 |
| 2019/0271719 A1 | 9/2019 | Sterzbach |
| 2019/0331720 A1 | 10/2019 | Cummings |
| 2020/0303076 A1* | 9/2020 | Toumazou ............. G16H 80/00 |
| 2021/0011824 A1* | 1/2021 | Parsons ................. B25J 9/1679 |

OTHER PUBLICATIONS

International Search Report and Written Opinion issued for corresponding PCT Application No. PCT/US2023/011518 dated Apr. 18, 2023, 9 pages.
Extended European Search Report issued for European Patent Application No. 23747549.6 dated Jan. 9, 2026, 17 pages.

* cited by examiner

100

400

SYSTEMS, APPARATUS AND METHODS FOR AUTOMATICALLY TESTING SECURITY DEVICES

CROSS-REFERENCE TO RELATED APPLICATIONS

This application is a National Stage Application, filed under 35 U.S.C. 371, of International Patent Application No. PCT/US2023/011518, filed on 25 Jan. 2023, which claims priority to U.S. Provisional Application No. 63/302,606 filed 25 Jan. 2022, entitled "Systems, Apparatus and Methods for Automatically Testing Security Devices", the entireties of which are incorporated herein by reference.

FIELD

The present disclosure generally relates to systems, apparatus and methods for testing security devices, and more specifically, to systems, apparatus and methods for automatically testing security devices through mobile devices without human intervention.

BACKGROUND

A security device often works together with one or more mobile devices nowadays to ensure security. For example, a video doorbell installed on a door can wirelessly communicate with an associated smartphone, such that a live stream video of a visitor at the door can be displayed on a screen of the smartphone for security check, wherever the smartphone is. In another example, a home security camera installed inside a house can wirelessly communicate with an associated tablet, such that a live stream video of one or more rooms can be displayed on a screen of the tablet for security monitoring. While testing this kind of security devices needs a mobile device, existing setup for testing the security devices is manually performed by a user, including but not limited to: creating accounts, downloading apps, powering doorbells with regular consumer grade wiring, etc. Once the setup is completed, the testing itself is also completed manually by a user.

SUMMARY

An object of the present disclosure, among others, is to provide systems and methods to automatically test security devices through corresponding mobile devices. The same systems and methods can also be used to perform functional testing of any device that requires a mobile phone to control it.

In one embodiment, a system for automatically testing security devices is disclosed. The system comprises: a plurality of test chambers coupled on a frame, wherein each of the test chambers is configured to house: (a) a corresponding one of a plurality of security devices to be tested and (b) a corresponding one of a plurality of mobile devices; and a plurality of test computers coupled to the frame, wherein each of the test computers corresponds to one of the plurality of test chambers, and has a processor and a non-transitory computer readable storage medium for automatically testing a corresponding one of the plurality of security devices using a test software. The corresponding mobile device is connected to the test computer and has a test application installed thereon corresponding to the test software. The test application and the test software cooperate during the testing to control the corresponding mobile device to communicate with the corresponding security device.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION

Figure 1:
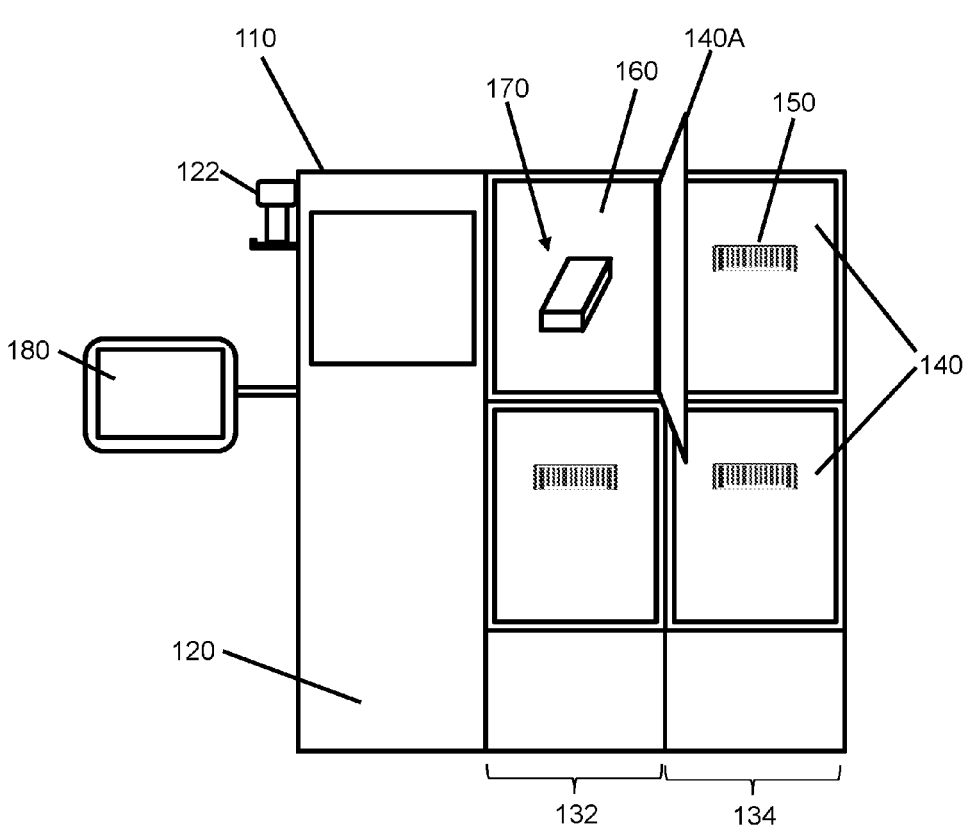
FIG. 1 is an illustration of an exemplary security device testing apparatus, in accordance with some embodiments of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "vertically," "downwardly," "upwardly," etc.) should be construed to refer to the orientation as then described or as shown in the drawing under discussion. These relative terms are for convenience of description and do not require that the apparatus be constructed or operated in a particular orientation.

Various embodiments of the present disclosure provide methods and systems for automatically testing security devices, e.g. video doorbells and home security cameras.

The functional testing performed includes but not limited to: testing Wi-Fi connections, microphone, speaker, button functions, motion sensor apparatus, LED functions, daytime camera mode, night time camera mode, etc. All of these tests can be triggered automatically by test software running on a test computer and a test application running on a mobile device, e.g. a smartphone.

The testing software and testing application automate at least one of the testing process, data collection, and testing result report. The mobile device can automatically pair the security device under test to a user account before performing the above tests. The use account may be a locally-generated account or may be an external account accessed via the internet or other computer network, and in some embodiments may be a dedicated testing account at a third party server. After the tests, a report of the testing results is generated and uploaded to a database, and the security device is un-paired from the user account.

The disclosed systems and methods may be used to perform functional testing for home security devices, but can also be used for any functional testing of any device that requires a mobile phone to control it. The testing is automated and standardized based on the disclosed methods. In an embodiment, the test procedure is stored on a local computer/memory device. In another embodiment, the test procedure is stored on a remote computer/memory device, e.g., on the manufacturer's server of the device being tested. For example, the system automates multiple aspects of testing: the account setup, device pairing, device setup and function testing process. This automation allows for a single operator to test multiple devices at once, greatly increasing the efficiency of the operator performing the tests. This automation also increases the quality of the test by removing the human interaction from the process steps during the testing as well as data recording after the test.

An illustrative embodiment of a security device testing apparatus 100 is shown in FIG. 1. The methods in the present disclosure can be applied for not only testing security devices, but also other electronic devices in connection with a mobile device. The security device testing apparatus 100, as shown in FIG. 1, comprises a frame 110, a plurality of test chambers 140, a test equipment cabinet 120, a user monitor 180 connecting to a master computer. Each of the plurality of test chambers 140 has a door 140A and fixtures inside the test chamber 140 for testing a corresponding security device 170.

The frame 110, as shown in FIG. 1, is a structure forming a plurality of slots 160. The plurality of test chambers 140 are each positioned in one of the plurality of slots 160 of the frame 110. The plurality of test chambers 140 may be substantially square or rectangular members, or any shape necessary to fit the slots 160.

In the example shown in FIG. 1, the frame 110 has four slots. That is, there are four test chambers 140 in the security device testing apparatus 100 in the exemplary embodiment shown in FIG. 1. The number of slots 160, the number of test chambers 140, and correspondingly the number of security devices that can be simultaneously tested, may vary based on the application. In one example, the column 134 of test chambers can be detached from the column 132, such that only two slots and test chambers are used for testing. In another example, one or more additional columns of test chambers can be attached to the frame 110 to perform testing in more test chambers simultaneously. The frame 110 may be constructed out of any material that provides sufficient rigidity for the security device testing apparatus 100, including metals, plastics, and other materials known to those with ordinary skill in the art.

In one embodiment, each of the plurality of test chambers 140 contains or is a radio frequency (RF) shielded cabinet located at a respective slot 160. The door 140A of each of the plurality of test chambers 140 may be moveably or slidably mounted to the frame 110. After the door 140A is opened, a security device to be tested may be placed into the corresponding test chamber 140.

In some embodiments, there are multiple test computers, each of which corresponds to a respective test chamber. The test computers may be located in the test equipment cabinet 120; and may be connected to a master computer located in the test equipment cabinet 120 as well. The master computer may be a central computer that controls and communicates to each test computer, e.g. via Internet, a wireless local area network (LAN), or a Universal Serial Bus (USB) hub. The master computer has a graphic user interface (GUI) running thereon. The GUI may display list and status of tests being performed. At the end of a test cycle, the master computer will pull all, or select ones, of the results and parametric test data from the test computers and display them for the user. In one embodiment, the user monitor 180 may serve as a GUI for the master computer.

The master computer can send a command to a test computer to start testing. Upon receiving the command, the test computer runs a testing software to control testing of the security device 170 in a corresponding test chamber, e.g. via a tablet or a smart phone located in the corresponding test chamber as well. For example, the test computer can send a command or signal to the phone or tablet running a test application thereon to trigger a test on the security device in the corresponding test chamber. For example, the command may simulate a person performing a click, touch, press or slide on the screen of the tablet, to enable an action on the test application. The command or signal may be sent by the test computer to the phone or tablet through a wired connection, a USB hub, and/or the Internet.

In one example, the device to be tested, upon receiving a signal from the application, may perform an action like taking a picture, detecting a motion, press a doorbell button (by an operator), etc. The device to be tested can send the test results to the corresponding phone or tablet, which may forward the test results to the test computer to analyze the test results. After the testing, the test computer can send a signal to the master computer to indicate that the test is done, and send test results to the master computer for reporting and/or storage. After the tests, the master computer may collect all test results and send the test results to a database.

Each slot or chamber has a corresponding unique slot number 150, which may be a bar code. In some embodiments, the apparatus or system 100 includes a scanner 122 attachable to the frame 110 and electrically connected to the master computer and configured to: scan slot numbers 150 corresponding to the test chambers 140, scan serial numbers of the mobile devices, and/or scan serial numbers of the security devices. For example, before testing a security device, the scanner may first scan a slot number 150 on a door 140A of the test chamber 140 in which the security device will be tested. Then, the user monitor 180 may show an instruction or indication to scan a serial number, e.g. an international mobile equipment identity (IMEI), of the corresponding mobile device for communicating with the security device during testing in the test chamber, which has the scanned slot number. Following the instruction or indication, the scanner may scan a serial number of the corresponding mobile device, as well as a serial number of the security device to be tested before it is positioned in the test chamber for testing. After the scanning of the slot number and the serial numbers, the scanned serial numbers are associated with the scanned slot number, such that the system knows which security device is tested in which slot or chamber through which mobile device. Then an operator can open the door 140A, and place the mobile device and the security device into the corresponding slot, e.g. slot N.

In some embodiments, when a bar code of a slot is scanned, a window is opened up on the GUI for entering information for that slot. Based on the entered information, the GUI can track every slot or chamber through individual threads and so that the tests in different chambers can run independently of each other.

In some embodiments, the mobile device (tablet or smart phone) has been pre-associated with the corresponding test chamber, and the operator only needs to scan the serial number of the security device to associate the security device with the test chamber. In one embodiment, a selection, by the operator or by a signal from the test computer, is made on the test application of the mobile device to indicate that the testing of the security device is performed in the corresponding slot N through the mobile device, where the test may automatically start in slot N. The door 140A may be closed by the magnetic lock on the door 140A during the test. The same scanner may then be used to scan a slot number of another slot and a serial number of another mobile device and another security device to be tested in that slot, while the test is performed in slot N.

Since each test chamber 140 contains or is a RF shielded cabinet, after the door 140A is closed, a wireless signal cannot be transmitted directly through the walls of the RF shielded cabinet. In one embodiment, each RF shielded cabinet has at least one antenna mounted to and through a wall of the cabinet. In another embodiment, each RF shielded cabinet has at least one antenna on a wireless router, e.g. a Wi-Fi router, placed in the cabinet to communicate wireless signals with the alarm device and forward the signals outside the cabinet by wired cables.

In one embodiment, the test computers are positioned in the test equipment cabinet 120. In one example shown in FIG. 1, there are four RF shielded cabinets or chambers 140 positioned in two columns and two rows, where two RF shielded cabinets are stacked on the other two RF shielded cabinets respectively. Each RF shielded cabinet corresponds to a test computer positioned in the test equipment cabinet 120 below the test chambers 140. That is, in the example shown in FIG. 1, the test equipment cabinet 120 contains four test computers corresponding to the four RF shielded cabinets stacked over the test equipment cabinet 120.

In one embodiment, a test application is pre-installed on a mobile device associated with the security device to be tested. Before testing, the test application is loaded, once for the entire test, on the mobile device. The mobile device may be connected to a Wi-Fi network after being positioned in the RF shielded cabinet 140, e.g. via a wireless router placed in the RF shielded cabinet 140; and may be connected to the corresponding test computer via cable. The corresponding security device in the RF shielded cabinet 140 may also connect to the same Wi-Fi network and communicate with the mobile device during testing.

Each test computer may also be connected to the same Wi-Fi network; or be connected to the corresponding mobile devices respectively. In one embodiment, each test computer has a processor and a non-transitory computer readable storage medium storing test software for testing a security device positioned in a RF shielded cabinet 140 corresponding to the test computer, through a corresponding mobile device. The mobile device has a test application installed thereon corresponding to the test software.

In some embodiments, the testing apparatus 100 may also include a sanity monitor (not shown) that can display internal views of all of the test chambers 140 of the system, when the doors 140A are closed and the tests are being performed. For example, in the example shown in FIG. 1, where there are four test chambers 140, the sanity monitor may show what is going on in each of the four chambers in four split screen views in the sanity monitor. In one embodiment, the four split screen views have a same size. In another embodiment, after one chamber or cabinet is selected, the selected chamber is shown in a large screen view, and the other three chambers are shown in three small screen views respectively.

In some embodiments, all cabling for power and communication related to the testing are routed inside the frame 110. A mobile device, e.g. a mobile phone, is inside each test chamber 140 to communicate with the security device under test. Routers, AC power, and single-board computer (SBC) may also be supplied inside the test chambers to perform the setup and testing.

Figure 2:
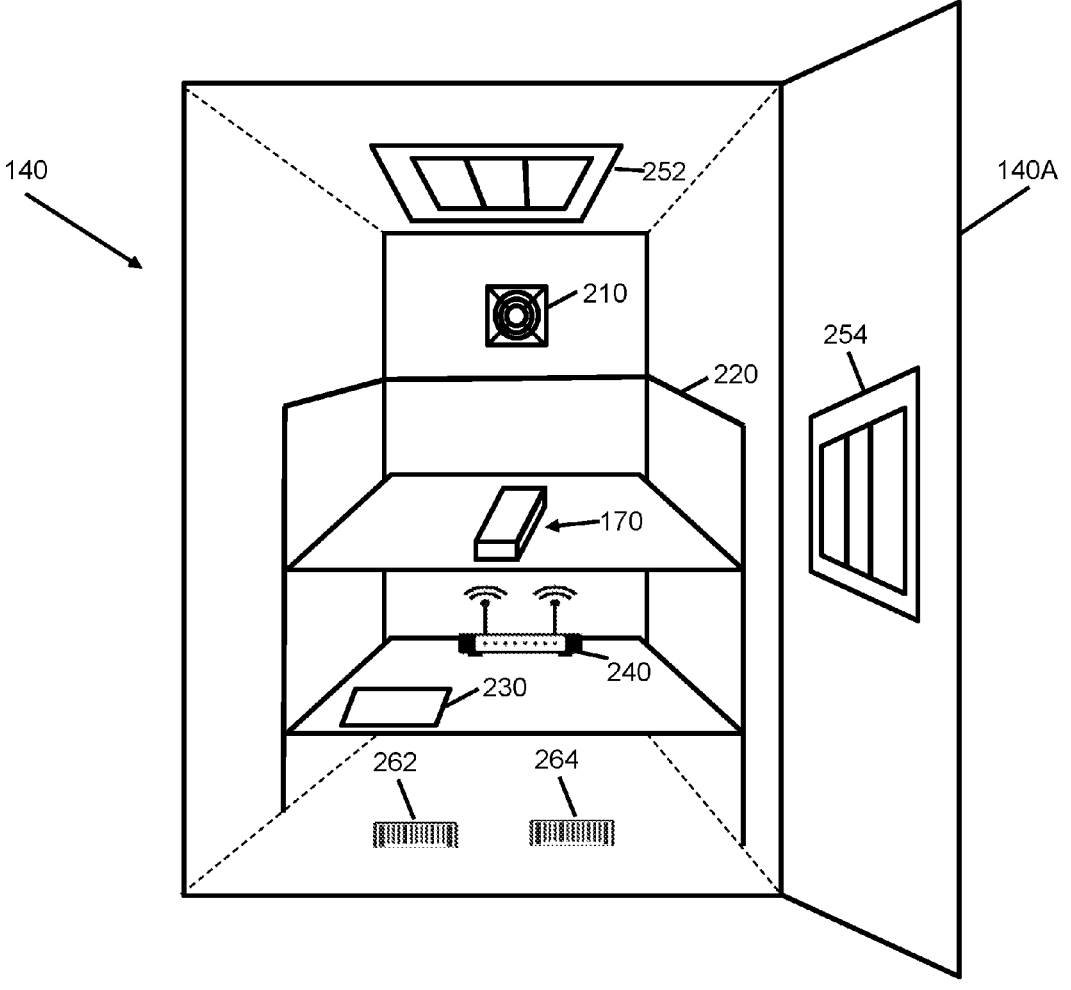
FIG. 2 illustrates an inside view of an exemplary test chamber on a security device testing apparatus, in accordance with some embodiments of the present disclosure.

FIG. 2 illustrates an inside view of an exemplary test chamber 140 on a security device testing apparatus, e.g. the security device testing apparatus 100 in FIG. 1, in accordance with some embodiments of the present disclosure. As shown in FIG. 2, with the door 140A open, there are various components inside the test chamber 140 for testing the security device 170. For example, the test chamber 140 may include a fan 210 mounted through the back wall of the test chamber 140, a shelf 220 placed inside the test chamber 140, a mobile phone 230 (which can be replaced by a tablet or another mobile device) located on the shelf 220, and a wireless router 240 located on the shelf 220. In some embodiments, the security device 170 and the mobile phone 230 are wirelessly connected to the wireless router 240, which may be a Wi-Fi router electrically connected to the corresponding test computer by wire, e.g. a cable going through the test chamber 140 via Ethernet coupler or USB interface on the back wall of the test chamber 140. In other embodiments, while the security device 170 is wirelessly connected to the wireless router 240 which is electrically connected to the corresponding test computer by cable, the mobile phone 230 is directly connected to the corresponding test computer by cable. As such, each mobile device for testing a corresponding security device can communicate with a corresponding test computer, via a Wi-Fi router inside the corresponding test chamber or a cable going through the corresponding test chamber, without being interfered by other wireless signals. In some embodiments, the wireless router 240 may be wire-connected to a network switch or another router outside the test chamber 140, such that the security device 170 and the mobile phone 230 may be connected to the Internet via the wireless router 240.

In some embodiments, after putting the security device 170 into the test chamber 140, the operator can connect the security device 170 to a power supply outlet in the test chamber 140 if the security device 170 is run by a power cord, or just put the security device 170 on the shelf 220 if the security device 170 is run by battery.

As shown in FIG. 2, the shelf 220 has multiple layers, where the security device 170 is placed on the top layer, and the wireless router 240 and the mobile phone 230 are placed in a lower layer. The placement of the devices in the test chamber 140 may be up to the operator, according to various embodiments. The number of layers of the shelf 220, the color, shape and material of the shelf 220 can be varied according to various embodiments.

In some embodiments, the test chamber 140 may also include an outlet power strip mounted on a side wall of the test chamber 140. The outlet power strip may receive power from outside the test chamber 140 via a power cable connecting to a power entry module on the back wall of the test chamber 140, and provide power to any device placed inside the test chamber 140.

In some embodiments, the phone or tablet 230 in the test chamber 140 has an application installed to control the security device to be tested. The application may be the same application installed on a user's tablet or mobile phone to control the use of the security device after the security device is sold to or otherwise owned by the user. The application in this example may receive commands initiated by a test computer corresponding to the test chamber 140.

In some embodiments, the phone or tablet 230 in the test chamber 140 is associated with a user account or a test account for the corresponding chamber 140. Before testing a security device in the chamber, the application first pairs the account to the security device. In some embodiments, the test chamber 140 may further include a single board computer (SBC) placed on the shelf 220 to help pairing the account to the security device, e.g. based on a hand-shake protocol.

In one example of testing a doorbell button on the security device 170, the GUI may prompt an instruction instructing an operator to press the doorbell button. After the doorbell button is pressed, the application running on the mobile phone 230 can automatically determine whether the doorbell button works or not, e.g. via communications with the security device 170 through the wireless router 240 and/or the Internet. Then, the mobile phone 230 can send the test result to the test computer corresponding to the test chamber 140, which will report to the master computer and show the test result via the GUI.

In another example of testing a motion detection function of the security device 170, the GUI may prompt an instruction instructing an operator to open the door 140A and wave a hand or other object in front of the security device 170. Once the hand motion is detected by the security device 170, the security device 170 can send a signal to the wireless router 240, which will forward the signal to the application on the mobile phone 230. The mobile phone 230 is monitored by the test computer corresponding to the test chamber 140, such that the test computer can report to the master computer to show via the GUI that the motion is detected by the security device 170.

For some tests like LED and speaker tests for the security device 170, the operator needs to determine whether the test is PASS or FAIL. The operator can use a scanner to scan the bar code 262 on the floor of the test chamber 140 to indicate a PASS of the test to the master computer; or use the scanner to scan the bar code 264 on the floor of the test chamber 140 to indicate a FAIL of the test to the master computer.

In some embodiments, to test a camera on the security device 170, a paper 252 with multiple color strips printed thereon is attached to the ceiling of the test chamber 140 while the camera of the security device 170 is facing up. Based on the application running the mobile phone 230 and the communication with the security device 170, the mobile phone 230 can display the video or photo taken by the camera of the security device 170. During the camera test, the mobile phone 230 can take a screenshot to save the picture taken by the camera of the security device 170 regarding the colorful strips. The operator can determine whether the picture is clear enough or not to pass or fail the test. The door 140A may be closed during the test. The test chamber 140 may include lights turned on and off to test the camera in day and night visions respectively.

In case the security device 170 is a standing device with a camera facing the door 140A, there is another paper 254 with multiple color strips printed thereon and attached on the inside of the door 140A to test the camera as discussed above. After the door 140A is closed, lights in the test chamber 140 may be turned on and off to test the camera in day and night modes respectively.

After all tests on the security device 170, the application may un-pair the account from the security device 170. After a new security device is placed in the test chamber 140 for testing, the account will then be paired with the new security device. Different chambers may be associated with different accounts.

During a setup or initialization phase, the application on each phone or tablet can quickly check whether a wireless router is present and can be connected for the corresponding chamber. In some embodiments, different functionalities on different security devices can be tested simultaneously in the chambers. That is, different tests may be performed simultaneously on different security devices via different phones or tablets. In some embodiments, different models or types of security devices can also be tested simultaneously in different chambers using respective test computers.

In one embodiment, the door 140A has a magnetic lock thereon for locking the door 140A magnetically. In one embodiment, once after the testing of the security device in the RF shielded cabinet or the corresponding test chambers 140 is completed, the magnetic lock on the door 140A is automatically released. Through this disclosure, an automatic action means it is done without human intervention.

Figure 3:
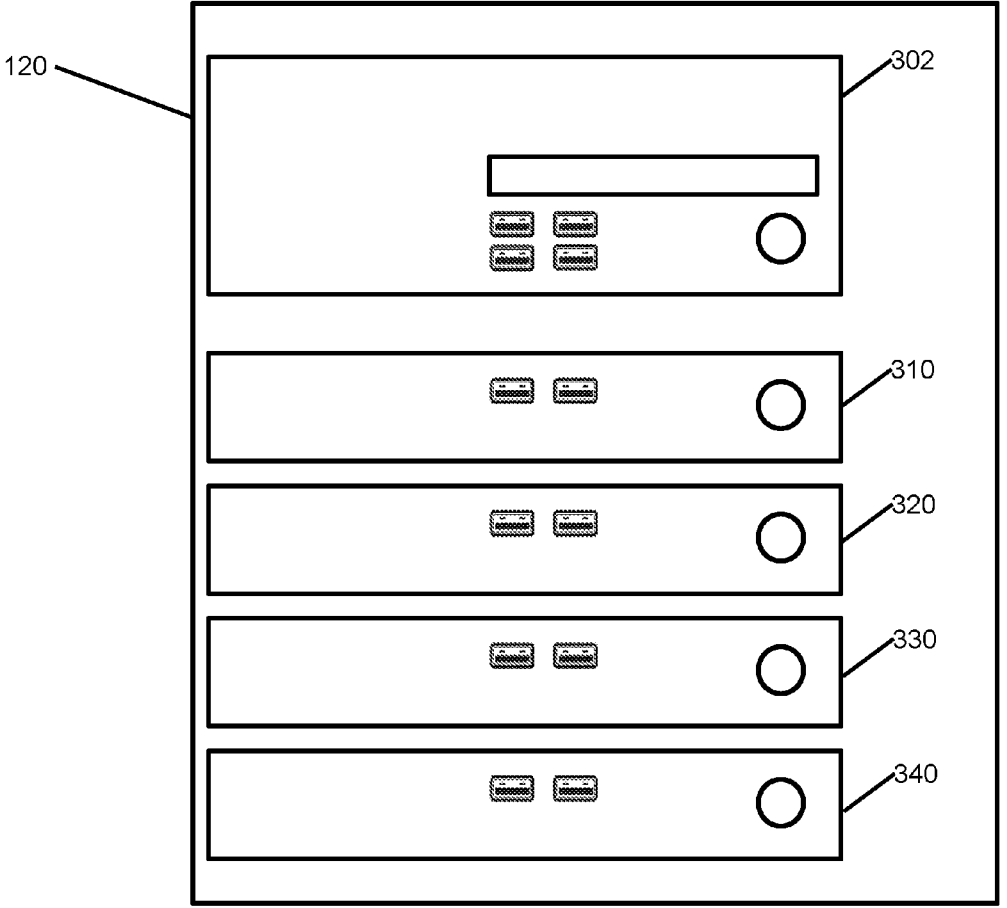
FIG. 3 illustrates an inside view of an exemplary test equipment cabinet on a security device testing apparatus, in accordance with some embodiments of the present disclosure.

FIG. 3 illustrates an inside view of an exemplary test equipment cabinet 120 on a security device testing apparatus, e.g. the security device testing apparatus 100 in FIG. 1, in accordance with some embodiments of the present disclosure. As shown in FIG. 3, there are various devices and components placed inside the test equipment cabinet 120, including e.g.: a master computer 302, and four test computers 310, 320, 330, 340. As discussed above, each of the test computers 310, 320, 330, 340 corresponds to a test chamber to control testing of the security device in that corresponding test chamber. The master computer 302 may be connected to each of the four test computers 310, 320, 330, 340 via cables and/or network switch.

In some embodiments, the user monitor 180 may be connected to the master computer 302 via a USB cable and/or a High-Definition Multimedia Interface (HDMI) cable. In some embodiments, the scanner 122 used to scan the bar codes on the frame 110, the mobile devices and the security devices may be a wireless scanner or a wired scanner. For a wired scanner, it may be connected to the master computer 302 via a USB cable.

In some embodiments, the master computer 302 runs a client software communicating with the GUI on the user monitor 180; and each test computer runs a test software communicating both with the client software on the master computer 302, and with the test application running on the phone or tablet in the corresponding test chamber. As such, the test status, test results and instructions regarding the tests can be shown on the GUI during the testing. In some embodiments, to add one more test for the security device, changes can be made on the test software running on the test computer, without changing the test application running on the phone or tablet.

In some embodiments, there are device specific sub-fixtures in the frame. Different devices have different hardware configurations. For example, different security devices may have different form factors. Some devices may have internal batteries while other devices may require an AC power or USB power to operate. The test chambers allow for device specific sub-fixtures needed to be installed and used in operations. The internals of the RF shielded cabinet allow devices to operate with minimal interference while still being in a close proximity for minimal operator movement, with layers of computational power.

In some embodiments, a security device to be tested is at least one of: a video doorbell, a security camera, or a motion sensor device. In some embodiments, a mobile device communicating with a security device being tested is at least one of: a smartphone, a smart watch, or a tablet.

As discussed before, after scanning a slot number of the cabinet and scanning a serial number of the mobile device and a serial number of the security device, the system associates the scanned serial numbers with the scanned slot number. Based on the serial numbers of the security device and the mobile device, the system can automatically determine, e.g. from a database stored in the master computer or in a cloud server, testing-related information of the security device. In various embodiments, the testing-related information comprises information about at least one of: an operation system of the mobile device, number and locations of physical buttons of the mobile device, functions of the security device, number and locations of physical buttons of the security device, operation modes of the security device, and/or hardware, firmware and software features of the mobile device and the security device.

In some embodiments, testing the security device may comprise automatically testing some key functions of the security device based on the test application running on the corresponding mobile device and/or the test software running on the corresponding test computer. The key functions may include but are not limited to: a Wi-Fi connection of the security device; a microphone of the security device; a speaker of the security device; button functions of the security device; a motion detection function of the security device; LED functions of the security device; a daytime camera mode of the security device; and a nighttime camera mode of the security device.

In some embodiments, during the testing of the security device, the system may automatically test a Wi-Fi connection of the security device, based on the test application and/or the test software. The Wi-Fi connection functionality may be tested with other tests being performed in the background.

In some embodiments, before the testing, the mobile device automatically pairs the corresponding security device with a corresponding user account under control of the test application and the test software. In some embodiments, after the testing, a report of test results of the testing is automatically generated in association with the corresponding user account by the corresponding test computer; and the corresponding mobile device automatically un-pairs the corresponding security device from the corresponding user account under control of the test application and the test software.

During the automatic testing, for each successful test, the test application sends a pass signal to the test computer, which forwards the pass signal to the master computer, which may display a green check or another indication on the user monitor 180. The user monitor 180 is electrically connected to the test computer and configured for providing and displaying one or more results of the testing of the security device. After the automatic testing is completed, the test computer may automatically send a result of the testing of the security device to the user monitor 180 for display. Failure codes related to the automatic testing will be sent to a database to be stored thereon. The test result can be printed out with a serial number (e.g. IMEI), a bar code associated with the test, and/or a label corresponding to the failure codes.

In one embodiment, a test application is pre-installed on the mobile device before it is placed in the test chamber. The test application can communicate device information of the mobile device and the security device to the test computer which determines the test suite to be executed for that particular make and model of the security device. The test application may have cross platform support for iOS and Android OS, or other operating systems.

Each test computer comprises test software and drives the test functionality through the test application. The test software communicates with the test application and triggers various test activities and notifies the user to perform specific tasks as required by each test. Through all the features and subsystems described above, a test procedure can be made completely automated and parametric.

Figure 4:
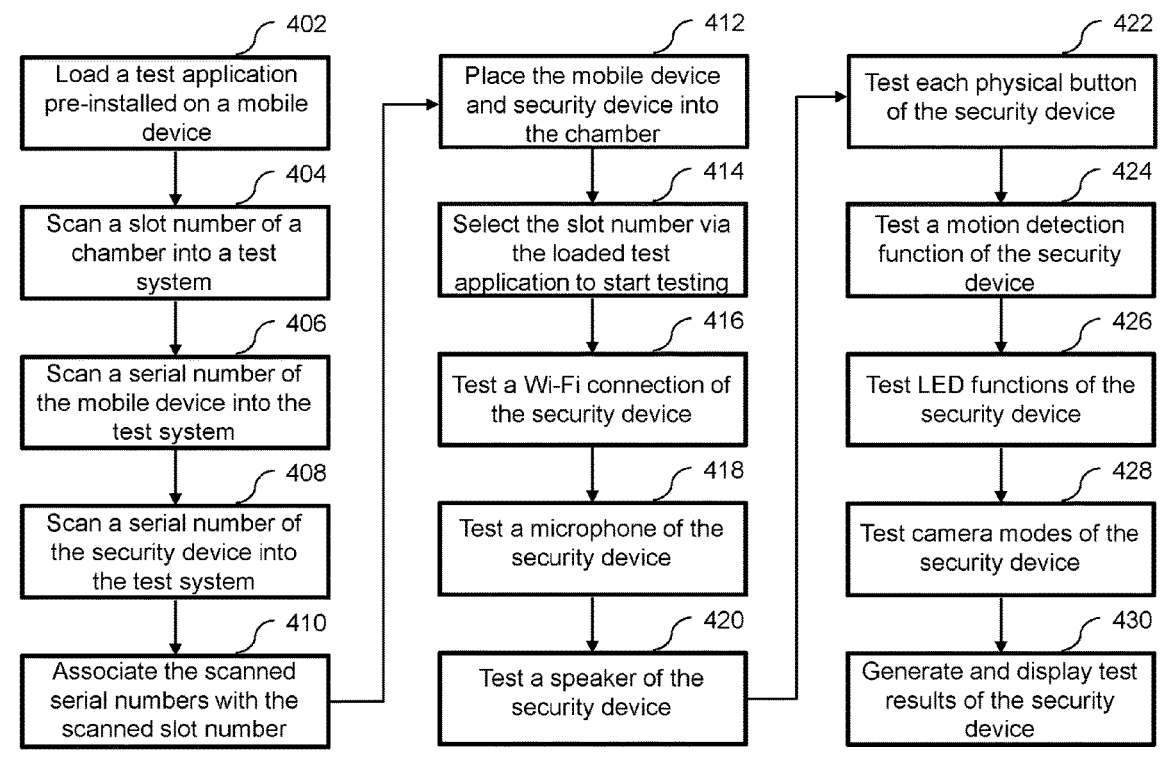
FIG. 4 is a flow chart showing an exemplary method for automatically testing a security device, in accordance with some embodiments of the present disclosure.

FIG. 4 is a flow chart showing an exemplary method 400 for automatically testing a security device. At operation 402, a test application pre-installed on a mobile device corresponding to the security device is loaded. At operation 404, a slot number of a chamber is scanned into a test system. At operation 406, a serial number of the mobile device is scanned into the test system. At operation 408, a serial number of the security device is scanned into the test system. At operation 410, the scanned serial numbers are automatically associated with the scanned slot number. At operation 412, the mobile device and the security device are placed into the chamber. At operation 414, the slot number is selected via the loaded test application on the mobile device to start automatic testing.

At operation 416, a Wi-Fi connection of the security device is tested. At operation 418, a microphone of the security device is tested, e.g. based on a speaker built in or coupled to the mobile device. At operation 420, a speaker of the security device is tested. At operation 422, each physical button on the security device is tested. At operation 424, a motion detection function of the security device is tested. At operation 426, LED functions of the security device are tested. At operation 428, camera modes of the security device are tested, e.g. a daytime camera mode and a nighttime camera mode. At operation 430, test results of the security device are generated and displayed, e.g. on a user monitor.

In one embodiment, operations 416 to 430 described above are performed automatically without any human intervention. The order of the operations shown in FIG. 4 may be changed according to different embodiments of the disclosure.

In some embodiments, a security device, e.g. a Ring Video Doorbell, may be tested using the disclosed system. The security device is placed in a test chamber which includes a phone with Internet connectivity and Ring application installed, and fixtures for the Ring doorbell. Before testing any device, an operator may first set up the testing software running on the test computer.

In some embodiments, the testing application software on the test computer may be set up following a process like that described below. First, open the Tester Application software on the computer, e.g. by double clicking on a shortcut icon on the Desktop. Upon the next screen on the software interface, enter a valid tech-ID, and press the Start button.

Each phone is designated and configured to be with the designated chambers. The operator should not move the phones or unplug the charging cable at any point during the test, which could cause the software to fail. Each phone should have Ring App installed on it and the Ring app should be open at all the times. The phone should be on the Dashboard screen at the beginning of the test. If the Ring App slows down due to overuse, close all the application and restart the Ring App or restart the Phone.

In some embodiments, the test process for the security device may include the following steps: (1) RASPBERRY PI setup; (2) UNIT INFORMATION entry; (3) PAIR DEVICE; (4) BUTTON TEST; (5) POWER ADAPTER; (6) LED; (7) CHIME TEST; (8) MOTION SENSOR; (9) LIGHTS; (10) SIREN; (11) PRE-ROLL; (12) RADAR; (13) SPEAKER; (14) MICROPHONE; (15) DAY VISION; (16) NIGHT VISION; (17) REMOVE DEVICE; and (18) DATA ENTRY.

In some embodiments, step (1) of RASPBERRY PI setup performs a set up for a SBC, Raspberry Pi, which includes adding the account information, password and Wi-Fi credentials.

In some embodiments, step (2) of UNIT INFORMATION entry further includes sub-steps like those below. First, scan the SLOT information on each chamber or hit the "Enter Info" button on the software, to scan the unit information and begin the test. Then scan the Serial Number in the respective field. If the data was not scanned correctly, software will notify that with a prompt. Once the Serial Number is scanned correctly, the software will pull the MAC-ID and the device information from On Line Provisioning (OLP) database application automatically and begin the first test. Make sure that the device has completed its initial boot-up sequence and the device is in set-up mode before scanning the Model ID. For example, the Cocoa devices have the Serial number and the MAC ID's in the battery compartment, so scan the details, insert the battery, wait until it finishes the initial boot-up sequence and then hit the set-up button and scan model ID as "COCOA". If due to some reason, the Ring device to be tested is already connected to Ring app and the device is shown in the Ring App, avoid hitting the set-up button and scan the unit information, the test software will look for the existing device and start the test automatically.

In some embodiments, step (3) of PAIR DEVICE further includes sub-steps like those below. The pairing process will begin once the Unit Information is verified and confirmed by the software. It will restart the raspberry pi, enter the unit information, and add the device to the Ring App on the Android phone. This step does not require any user input and the software will complete the setting up the device once it is paired correctly to the Ring App.

In some embodiments, step (4) of BUTTON TEST further includes sub-steps like those below. The test software needs user input to complete the button test. This is indicated by blinking Yellow button on the bottom of the test. This box does display a message "Press Doorbell button-NO SCAN". User has to push the doorbell in order for this test to complete. This test does not apply to all the devices that are being tested on the system. This test only applies to Ring Video Doorbells. Sometimes, the doorbell test does not work in the first attempt, the reason being Ring devices might be going through an update. This is notified by the software in RED with a prompt of a message "UPDATING". While it is updating, the Ring device does not provide all its functionalities. Wait for it to complete its update and try again after the update sequence is complete. Update sequences may vary by device type. For example, for doorbell devices: White LED blinks/BLUE LED Blinks; for Stick-up Camera: 3 Blue LED blinks and then 1-2 sec NO LED. Then, scan "SLOT FAIL" if the button test does not work.

In some embodiments, step (5) of POWER ADAPTER further includes sub-steps like those below. The test software needs user input for this test, which is only for a device running by a power adapter. Manually plug in the device using the Power Adapter and the Solar Panel power adapter to make sure that the device is getting power. Do not remove the battery from the device. Scan "SLOT PASS" if the device is powered manually. Scan "SLOT FAIL" if the power adapter test does not work.

In some embodiments, step (6) of LED further includes sub-steps like those below. The test software needs user input for this test. Manually check, if being able to see the device LED, scan "SLOT PASS". Scan "SLOT FAIL" if the LED does not work.

In some embodiments, step (7) of CHIME TEST further includes sub-steps like those below. The test software needs user input for this test. This test applies only to some select Ring Video Doorbell devices. Place the Ring device in the Chime fixture and press the doorbell. Manually verify if being able to hear the mechanical door chime as well as the Ring doorbell chime and scan "SLOT PASS". Scan "SLOT FAIL" if not able to hear the mechanical door chime.

In some embodiments, step (8) of MOTION SENSOR further includes sub-steps like those below. The test software needs user input for this test. Open the Chamber door, wave in front of the device to trigger a motion. The software will detect the motion and pass this test automatically. This test should not be scanned PASS using the scanner. If it is a fail and device is not able to trigger a motion event, Scan Slot FAIL. Do not scan PASS.

In some embodiments, step (9) of LIGHTS further includes sub-steps like those below. This test is designed only for the Spotlight devices. The test software will turn the lights ON and will wait for the user input to verify if the Light is ON/OFF. Fail the device if the light does not turn ON.

In some embodiments, step (10) of SIREN further includes sub-steps like those below. This test is designed only for the Spotlight devices. The test software would request the operator to manually test for Siren. Turn on the Siren and then turn it OFF. If a loud Siren is not heard, FAIL the device.

In some embodiments, step (11) of PRE-ROLL further includes sub-steps like those below. This test is designed only for Scallop and Oyster devices. The test software would prompt an instruction to manually verify for the pre-roll by looking live view window by scrolling the video and playing it from the beginning. Fail the device, if the pre-roll video is not seen correctly.

In some embodiments, step (12) of RADAR further includes sub-steps like those below. This test is designed for Jellyfish devices. The test software will automatically enable the setting in the Ring App. Wave in front of the device and the software will detect the motion in the Ring App. Once the motion is detected, it will PASS the device. Fail the test if the motion is not detected correctly.

In some embodiments, step (13) of SPEAKER further includes sub-steps like those below. The test software needs user input for the speaker test. Open the Chamber and check the voice quality by speaking in the mobile device and listening through the speaker. Scan "SLOT PASS" if you are able to verify that the speaker is functional. Scan "SLOT FAIL" if the speaker does not work.

In some embodiments, step (14) of MICROPHONE further includes sub-steps like those below. The test software needs user input for the speaker test. Open the Chamber and check the voice quality by speaking in the Ring device and listening through the mobile device. Scan "SLOT PASS" if you are able to verify that the microphone is functional. Scan "SLOT FAIL" if the microphone does not work.

In some embodiments, step (15) of DAY VISION further includes sub-steps like those below. Once the previous test is passed successfully, software will display "Close the Chamber Door" to begin the Day Vision test. This is a fully automated test. The test software will check for the Day vision by turning on the LED strip in the chamber. Make sure that the device is placed in the correct positon so that it is facing either of the RGB color patterns mounted on the top or on the front door of the chamber. If the device is not placed correctly, it would cause false failures. The test software will take screenshots, verify the background colors and confirm that the day vision is working. The test software will automatically move to the next test.

In some embodiments, step (16) of NIGHT VISION further includes sub-steps like those below. This test does not require any user interaction. The test software will check for the Night vision by turning off the LED strip in the chamber. The test software will take screenshots, verify the background colors and confirm that the night vision is working. The test software will automatically move to the next test.

In some embodiments, step (17) of REMOVE DEVICE further includes sub-steps like those below. The test software will remove the device once all the test runs successfully. If during any of the above test, the software failed to complete the test due to Ring App errors (App freezing/not responding)/Wi-Fi issues (reconnecting to the Wi-Fi), then it can be either retested or verified manually with the test procedures mentioned above, if it is actually a true failure by performing a manual test. Fail the device if it is a true failure. If the device failed to complete any of the test, manually remove the device before starting with the next device.

In some embodiments, step (18) of DATA ENTRY further includes sub-steps like those below. The test software will send the data to OLP for logging purposes. The device will be either PASS/FAIL and will be logged under the tech-ID used at the beginning of the test.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, app, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network or as an app on a mobile device such as a tablet, Phablet, PDA, smartphone, or wearable technology The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer or mobile device, smartphone or tablet. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a mobile smartphone, a personal digital assistant (PDA), tablet, a mobile audio or video player, a game console, a Global Positioning System (GPS) receiver, to name just a few.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor or other monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input. Although examples are illustrated and described herein, embodiments are nevertheless not limited to the details shown, since various modifications and structural changes may be made therein by those of ordinary skill within the scope and range of equivalents of the claims.

The invention claimed is:

1. A system for automatically testing security devices, comprising:

a plurality of test chambers coupled on a frame, wherein each of the test chambers is configured to house:

(a) a corresponding one of a plurality of security devices to be tested and (b) a corresponding one of a plurality of mobile devices; and a plurality of test computers coupled to the frame, wherein each of the test computers corresponds to one of the plurality of test chambers, and has a processor and a non-transitory computer readable storage medium for automatically testing a corresponding one of the plurality of security devices using a test software, wherein:

the corresponding mobile device is connected to the test computer and has a test application installed thereon corresponding to the test software, the test application and the test software cooperate during the testing to control the corresponding mobile device to communicate with the corresponding security device;

wherein before the testing: the corresponding mobile device automatically pairs the corresponding security device with a corresponding user account under control of the test application and the test software;

wherein after the testing: a report of test results of the testing is automatically generated in association with the corresponding user account by the corresponding test computer; and the corresponding mobile device automatically un-pairs the corresponding security device from the corresponding user account under control of the test application and the test software.

2. The system of claim 1, wherein:

the corresponding security device is at least one of: a video doorbell, a security camera, or a motion sensor device; and the corresponding mobile device is at least one of: a smartphone, a smart watch, or a tablet.

3. The system of claim 1, wherein the testing comprises testing at least one of:

a Wi-Fi connection of the corresponding security device;

a microphone of the corresponding security device;

a speaker of the corresponding security device;

button functions of the corresponding security device;

a motion detection function of the corresponding security device;

LED functions of the corresponding security device;

a daytime camera mode of the corresponding security device; or a nighttime camera mode of the corresponding security device.

4. The system of claim 1, further comprising:

a master computer configured to communicate with each of the plurality of test computers and provide a graphic user interface (GUI) for interaction with a user, wherein the GUI displays status of tests being performed by the plurality of test computers during the testing, wherein the master computer is configured to obtain all test results and parametric test data from the plurality of test computers and display them via the GUI after the testing.

5. The system of claim 1, further comprising:

a user monitor electrically connected to the plurality of test computers and configured for providing test results of the plurality of security devices.

6. The system of claim 1, further comprising:

a plurality of radio frequency (RF) shielded cabinets each contained in a respective one of the plurality of test chambers therein;

a wireless router electrically connected to the plurality of test computers by wire; and at least one antenna coupled to and through a wall of each RF shielded cabinet to connect the wireless router with the corresponding mobile device in the RF shielded cabinet.

7. A system for automatically testing a plurality of electronic devices, comprising:

a plurality of radio frequency (RF) shielded cabinets coupled to a frame, wherein each of the RF shielded cabinets comprises:

a unique identifier associated with each of the plurality of RF shielded cabinets;

a corresponding one of the plurality of electronic devices;

wherein each of the plurality of electronic devices includes an identity code;

a corresponding mobile device;

a corresponding wireless router configured to wirelessly communicate with the corresponding electronic device and the corresponding mobile device;

a mounting device configured to receive the corresponding electronic device, the corresponding mobile device, and the corresponding wireless router; and an interface configured to allow passage of an electrical signal from the corresponding wireless router through a wall of the RF shielded cabinet;

a plurality of test computers coupled to the frame, wherein each of the test computers corresponds to one of the plurality of RF shielded cabinets and is operatively connected to the corresponding mobile device therewithin, and wherein each test computer includes a processor and a non-transitory computer readable storage medium;

wherein each of the test computers receives the corresponding unique identifiers and the corresponding identity codes from the scanning device and associates the unique identifier with the identity code of the corresponding electronic device, and associates each of the identity codes with a predetermined test procedure for that identity code and initiates the predetermined test procedure;

a master computer operatively connected to each of the plurality of test computers; and a display device coupled to the frame, wherein the display is operably connected to the master computer;

a scanning device operably connected each of the test computers, wherein the scanning device is configured to read, for each of the plurality of RF shielded cabinets and the corresponding electronic devices, the unique identifier of the RF shielded cabinet and the identity code of the corresponding electronic device, and transmits the unique identifiers and the identity codes to the corresponding test computer;

wherein the test computer is configured receive test results and parametric test data from each of the plurality of test computers and display the test results and the parametric test data on the display device;

wherein results of the testing of the plurality of electronic devices are shown on the display device;

whereupon after completion of the testing of the plurality of electronic devices, each of the test computers disassociates, for the corresponding RF shielded cabinets and the corresponding electronic device, the unique identifier from the identity code.

8. The system of claim 7, wherein a first one of the test computers sends a signal to the corresponding RF shielded cabinet to test the corresponding electronic device based on the associated identity code to initiate the predetermined test procedure for the corresponding electronic device.

9. The system of claim 7, wherein each of the plurality of electronic devices is tested simultaneously.

\* \* \* \* \*